July 30, 1963  J. A. PERRY, JR  3,099,156
TEMPERATURE ERROR COMPENSATOR
Filed Feb. 24, 1959  2 Sheets-Sheet 1

INVENTOR.
Joseph A. Perry, Jr.
BY
James C. Nemmers
E. Manning Giles
Atty.

INVENTOR.
Joseph A. Perry, Jr.

United States Patent Office 3,099,156
Patented July 30, 1963

3,099,156
TEMPERATURE ERROR COMPENSATOR
Joseph A. Perry, Jr., Cedar Rapids, Iowa, assignor to Cherry-Burrell Corporation, Cedar Rapids, Iowa, a corporation of Delaware
Filed Feb. 24, 1959, Ser. No. 795,275
3 Claims. (Cl. 73—141)

This invention relates to measuring devices and more particularly pertains to means for correcting temperature-induced errors in measuring devices having temperature-sensitive, elastically deflectable elements.

It is well known that temperature changes give rise to variations in both the elasticity and physical size of metals. Thus, one of the major problems encountered in providing accurate and dependable measuring devices having temperature-sensitive elements has been to compensate for the errors caused by variations in ambient temperature. These errors are commonly known to be of two types: "zero" shift and "span" shift errors. The magnitude of a "zero" shift error remains constant irrespective of the force measured, while the amount of a "span" shift error varies in direct proportion to the force applied. Since "zero" shift errors can be easily compensated for, the present invention is directed only to corrective means for "span" shift errors induced by ambient temperature variations.

Temperature-induced "span" shift errors can be of particular significance in force measuring devices which utilize some type of motion transducing means to amplify a relatively small deflection into a more easily readable amount of movement. A typical form of force measuring device with which my present invention is adapted to be used is the beam-deflection type disclosed in my co-pending application, Serial No. 641,664, filed February 21, 1957, now abandoned. In the past, when utilizing force measuring devices of the beam-deflection type, it has been necessary to determine the atmospheric temperature surrounding the device and then calculate a corrective factor to apply to the reading taken. This is both inconvenient and time-consuming and becomes impractical in control systems where force measuring devices are utilized to automatically control other components in the system.

It is therefore the principal object of this invention to provide means for substantially eliminating "span" shift errors caused by ambient temperature variations in measuring devices. In accomplishing this object, it is my intent to eliminate empirical methods of temperature correction.

It is a further object of the invention to provide a force measuring device in which two inherent sources of temperature-caused error are combined in such a way to nullify each other.

Concurrently with all of the above objects, it is a still further object of my invention to design a temperature compensator for measuring devices which is simple, low in cost, and readily adaptable for use in a variety of applications, while at the same time providing a compensator that is both highly dependable and accurate.

Other objects and features of the invention will be apparent from the following description taken in connection with the accompanying drawings in which.

Figure 1:
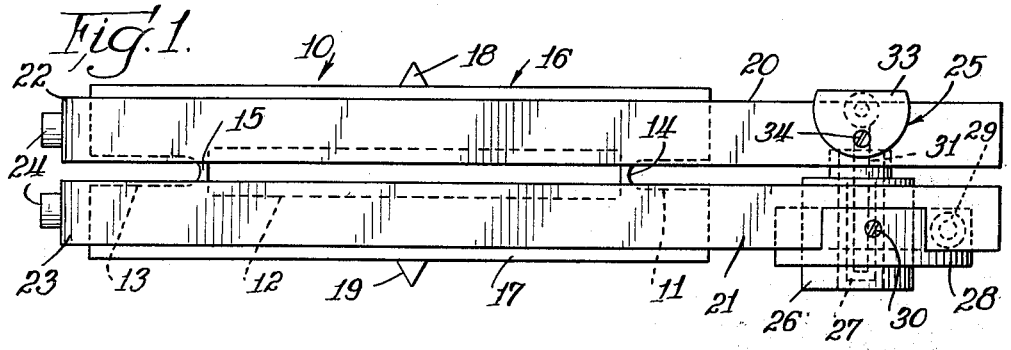
FIGURE 1 is a side view of a force measuring device that embodies my invention.
Figure 2:
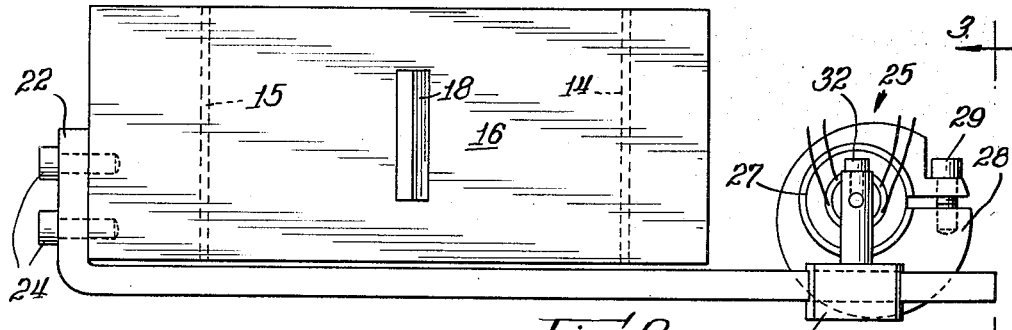
FIGURE 2 is a top view of the device shown in FIGURE 1.
Figures 3, 4:
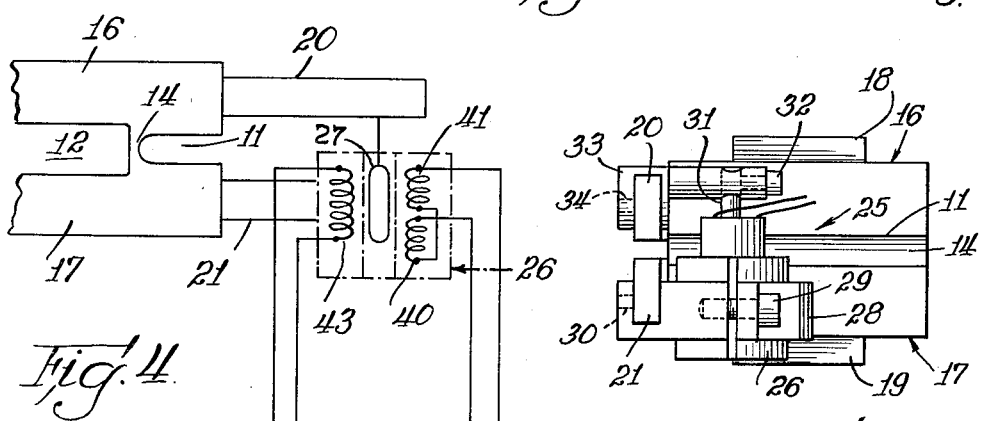
FIGURE 3 is a view on the line 3—3 of FIGURE 2.
FIGURE 4 is a circuit diagram of the electrical circuit used in my invention.

Referring to FIGURES 1, 2, and 3, there is shown a force measuring device of the type disclosed and claimed in my co-pending application, Serial No. 641,664, filed February 21, 1957, now abandoned. This device consists of a substantially rectangular block of spring steel, designated generally by the reference numeral 10, having slots 11 and 13 cut in both ends of the block across its entire width. A somewhat wider and longer slot 12 is formed in the center of the block 10, this slot extending and opening to the exterior of both sides of the block. Thus, there remains between each end slot 11 and 13 and the center slot 12, two web-like portions 14 and 15, which act as lateral flexures joining the top and bottom rectangular sections 16 and 17, which lie above and below slots 11, 12 and 13, respectively. The sections 16 and 17 act as parallel, face-to-face, spaced-apart simply supported beams. Bearing surfaces 18 and 19, which in the embodiment disclosed are shown as knife edges, are provided to receive the forces applied to the device for purposes of measurement. L-shaped levers or legs 20 and 21 for amplifying deflections of the beams 16 and 17 are attached at corresponding ends of the upper and lower beams 16 and 17, respectively, as shown in FIGURE 1. Each leg 20 and 21 has a foot portion 22 and 23, respectively, extending at right angles to the legs 20 and 21, and secured by means of a cap screw 24 to the corresponding end of the respective beam 16 or 17. The legs 20 and 21 extend longitudinally in parallel relation along the corresponding sides of the beams 16 and 17, but are spaced therefrom. Provided at the free ends of the legs 20 and 21 is a motion transducing means in a form of a differential transformer, which is indicated generally by the reference numeral 25.

The differential transformer 25, as illustrated in FIGURES 1, 2, and 3 is comprised of the combination of a hollow coil 26 and a cooperating core or armature 27 positioned axially within the coil 26. As is well known in the art, the coil portion of a differential transformer has a central or primary winding and two outer or secondary windings. The primary winding is ultimately connected to a source of alternating current. The secondary windings are connected in opposition and the voltage induced therein by the primary is transmitted through the two other leads to an indicator, such as that shown at 42 in FIGURE 4, which is calibrated in the desired force measuring units.

As will be understood, the amount and phase of the voltage induced in the secondary windings of the coil 26 depends upon the position of the core or armature 27 within the coil 26. When the armature 27 is centered, the opposed windings of the secondary tend to cancel out, causing zero output. As the armature 27 moves relatively from its center position, a net voltage is produced which increases in direct proportion to the amount of relative position change between the coil and armature.

The coil 26 is preferably mounted in a non-magnetic clamp 28 which, as shown in FIGURES 2 and 3, takes the form of a split ring with a cap screw 29 for drawing the ring together to grip the coil 26. The base of the clamp 28 is provided with a chordwise slot adapted to receive the free end of the lower leg 21. For the purpose of matching the output signals of two or more measuring devices, the clamp 28 may thus be moved longitudinally along the free end of the leg 21 to any desired position and is held in place by means of a set screw 30.

The armature or core 27 is preferably mounted on an axial rod 31 which projects beyond the core at one end and is secured by means of a set screw 32 to a supporting clamp 33. The clamp 33 is provided with a slot adapted to engage the free end of the leg 20 and is held in any desired longitudinal position thereon by means of a set screw 34, thus permitting exact axial alignment of the core 27 within the coil 26. Likewise, by loosening the set screw 32, core 27 may be raised or lowered with respect to the coil 26 and, by tightening set screw 32, held in the desired position. The above described adjustments permit the output signal of the device to be adjusted to the desired amount at zero load.

Referring now to FIGURE 4, there is shown a portion of the beams 16 and 17 and the deflection amplifying legs 20 and 21 to which are attached the coil 26 and armature 27. Diagrammatically there is shown a coil 26 composed of a primary winding 43 and two opposed secondary windings 40 and 41. The primary winding 43 is connected to an electrical power source 46, and the secondary windings 40 and 41 are connected to an indicator 42, which is calibrated in the desired force units.

The operation of the device as thus far described is as follows. Application of force to the bearing surfaces or knife edges 18 and 19 causes the beams 16 and 17 to bend inwardly, rotating about a point in the center of the web-like portions 14 and 15. Bending of the beams 16 and 17 rotates the connected legs 20 and 21 resulting in relative movement between their free ends. This relative movement of the free ends of beams 20 and 21 will move the core or armature 27, connected to beam 20, relatively to the coil 26, which is carried by beam 21. As the armature 27 moves from its previously centered position within the coil 26, a net voltage is produced, the amount of the voltage being in direct proportion to the relative change of position between the armature 27 and coil 26. This net voltage produces a reading on the indicator 42, which has been calibrated in the desired force units.

Figure 5:
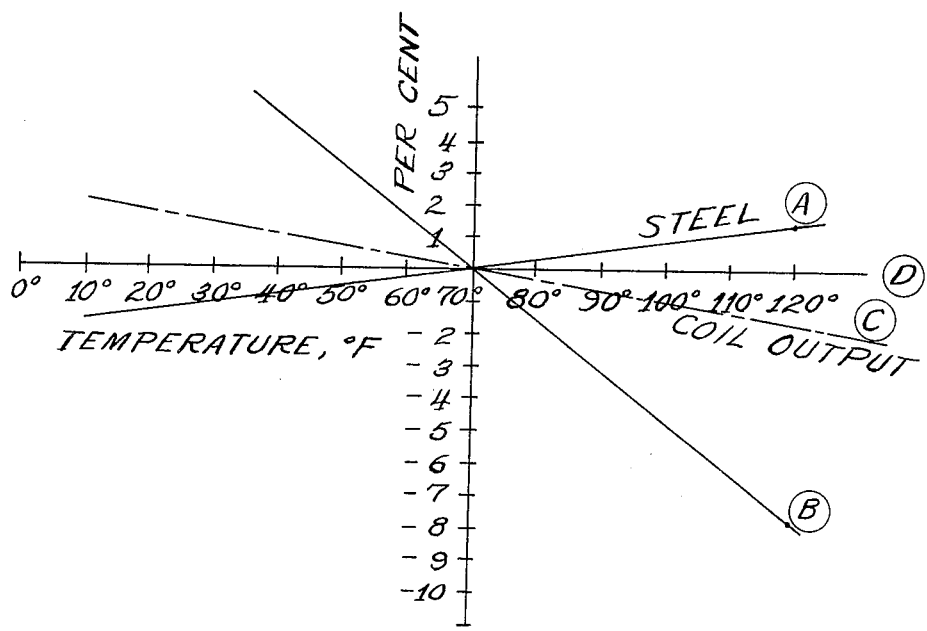
FIGURE 5 is a chart illustrating graphically temperature-induced errors commonly found in force measuring devices of the type described.

The device as thus far described does not include means to compensate for temperature-induced "span" shift errors which produce inaccurate readings at the indicator 42. "Span" shift errors are produced from temperature-induced changes in the elasticity and dimensions of the beams 16 and 17 and the legs 20 and 21. In FIGURE 5, line A represents the percent of change in deflection of spring steel under constant load with varying ambient temperatures. It should be noted that line A has a positive slope.

Simultaneously with the temperature-induced elasticity and dimensional changes in the beams 16 and 17 and the legs 20 and 21, there occurs temperature-induced resistance variations in the differential transformer 25. The output of a differential transformer is known to be inversely related to temperature since the voltage induced in the secondary is proportional to the current in the primary. In other words, as temperature increases, the output of the transformer will decrease because of an increase in the resistance of the transformer windings. In FIGURE 5, line B illustrates the percentage change in output of a differential transformer with varying ambient temperatures. It should be noted that line B has a negative slope. Thus, if the negative slope of line B could be made equal to the positive slope line A, the two would nullify each other, and the measuring device would be ideally compensated for "span" shift error.

Line C illustrates the temperature-induced errors in a transformer ideally designed to nullify the errors resulting from temperature-induced elasticity and dimensional changes in the beams 16 and 17 and legs 20 and 21. If line B can be rotated to the position of line C by some change in the transformer circuit, "span" shift errors will be nullified in the force measuring device.

Assuming that a very large temperature-stable resistance is added in series with the primary of the transformer, it is obvious that ambient temperature changes causing variations in the coil resistance would result in very small fluctuations in the primary circuit current. Thus, line B theoretically could be rotated to lie along line D. To accomplish the desired result of rotating line B to the position of line C, I place two temperature-stable "ballast" resistors 44 and 45 of properly selected magnitude in series between the primary winding of the transformer 25 and the electrical power source 46. I have termed these resistors "ballast" resistors as a means of describing a resistance placed in a a circuit to stabilize fluctuations in current flow due to variations in other resistive components in the same circuit.

The elasticity and dimensional changes occurring in metal as a result of ambient temperature variations can be determined either by trial and error, or by the well-known method of computing the temperature coefficients of elasticity and expansion, which are constant values. Also, the temperature coefficient of resistance of a differential transformer can be determined by methods well known in the art.

A theoretical determination of the "ballast" resistance, $R_b$, has been developed to include all variables.

$$R_b = R_p \left( \frac{K_t}{Q} - 1 \right)$$

where:

$R_p$ = resistance of the differential transformer primary winding.

$K_t$ = temperature coefficient of the differential transformer.

$Q$ = temperature coefficients of elasticity and expansion for the type of metal used in the measuring device.

In practice, the value of the "ballast" resistance is selected by trial and error to account for variations in specific types of metal, differential transformers, and mechanical arrangements. Tests have shown that a properly compensated force measuring device will produce highly accurate readings independent of temperature variations from 0° F. to 130° F.

One modification of my invention might be to provide a primary coil made of some element which has the proper temperature coefficient of resistance to compensate for the relative displacement of the coil 26 and armature 27 caused by the elasticity and dimensional changes in the beams 16 and 17 and legs 20 and 21. However, I prefer the more simple and economical method of providing "ballast" resistors in the primary coil circuit.

Having thus described my invention, and although it has been described in detail only with reference to certain preferred structures, it will be apparent to those skilled in the art that the principles of the invention are not limited to correction of temperature-induced errors in beam deflection type of measuring devices. For example, the principles of my invention can be readily applied to helical and cantilever spring and ring dynamometer type force measuring devices and also to fluid pressure measuring devices, such as the Bourdon tube type and bellows or diaphragm type where motion is resisted by a temperature-sensitive, elastically deflectable element. It is, therefore, my intention that such revisions and variations of the invention as are reasonably expected on the part of those skilled in the art will be included within the scope of the following claims.

I claim:

1. A force-measuring device comprising an elastically-deflectable member to which force is applied and which is subject to temperature-induced elasticity and dimensional changes, a differential transformer having an armature component and a coil component connected to said deflectable member to provide for relative movement of said components when said member deflects under applied force thereby producing an output signal, the magnitude of said signal being inversely related to temperature, a primary winding and a secondary winding in said coil component, a source of electrical power connected in circuit with said primary winding, a force indicator connected in circuit with said secondary winding, and a temperature-stable resistance of relatively high value connected in said primary circuit to stabilize temperature-induced changes in said transformer output signal a sufficient amount to nullify substantially the effects of temperature-induced changes in said deflectable member.

2. The force-measuring device of claim 1 in which said elastically-deflectable member includes two parallel spaced-apart beams connected at their ends by flexures, the force being applied at the centers of said beams, the coil component being connected to one beam, and the armature component to the other beam.

3. The force-measuring device of claim 1 in which the value of said resistance approximates $$R_p\left(\frac{K_t}{Q}-1\right)$$

where:

$R_p$=resistance of the differential transformer primary winding.
$K_t$=temperature coefficient of the differential transformer.
$Q$=temperature coefficient of elasticity and expansion for the type of metal used in said deflectable member.

References Cited in the file of this patent
UNITED STATES PATENTS

| | | |
|---|---|---|
| 2,081,748 | Janovsky | May 25, 1937 |
| 2,593,339 | Ostermann et al. | Apr. 15, 1952 |
| 2,657,353 | Wiancko | Oct. 27, 1953 |
| 2,729,973 | Strimel | Jan. 10, 1956 |
| 2,930,227 | Spademan et al. | Mar. 29, 1960 |

OTHER REFERENCES

"A Gauge for Measuring Compression Force," by Rinkel, published in the Journal of Scientific Instruments, vol. 24, pages 298–299, November 1947. (Copy is available in Div. 36, class 73–141.)

Basic Electrical Measurements, by Melville B. Stout, Prentice-Hall, Inc., Englewood Cliffs, N.J., 1950, pp. 414–418. (A copy is available in Div. 36.)